000
United States Patent [19]

Wight

[11] Patent Number: 5,056,114
[45] Date of Patent: Oct. 8, 1991

[54] METHOD AND APPARATUS FOR DECODING MANCHESTER ENCODED DATA

[75] Inventor: Mark S. Wight, Ottawa, Canada

[73] Assignee: Northern Telecom Limited, Montreal, Canada

[21] Appl. No.: 389,242

[22] Filed: Aug. 3, 1989

[51] Int. Cl.$^5$ .......................................... H04L 27/22
[52] U.S. Cl. .................................. 375/87; 375/110; 375/55; 375/94
[58] Field of Search .................. 375/87, 55, 86, 94, 375/95, 110; 328/63, 72; 307/511, 518

[56] References Cited

U.S. PATENT DOCUMENTS

| | | | |
|---|---|---|---|
| 4,531,223 | 7/1985 | Ashida | 375/110 |
| 4,608,702 | 8/1986 | Hirzel et al. | 375/110 |
| 4,688,232 | 8/1987 | Fox | 375/87 |
| 4,745,626 | 5/1988 | Wells | 375/87 |
| 4,752,942 | 6/1988 | Iwakami | 375/110 |

Primary Examiner—Douglas W. Olms
Assistant Examiner—Ralph Smith
Attorney, Agent, or Firm—R. John Haley; Dallas F. Smith

[57] ABSTRACT

A decoder for Manchester encoded data includes an up/down counter which constitutes a state machine. Consecutive bits with the same binary value in the encoded data bit stream enable the counter, whic is incremented or decremented in dependence upon the relative phase of an output clock signal. Incrementing occurs in response to phase errors of the output clock signal, and decrementing to a count of zero occurs in response to phase assertions indicating a correct phase of the clock signal. The phase of the clock signal is reversed, and the counter reset, if a maximum count is reached in response to repeated phase errors. Such a phase reversal or phase slip is avoided in the presence of single bit errors in the bit stream. The decoded data is derived from the bit stream by sampling in dependence upon the clock signal.

9 Claims, 2 Drawing Sheets

METHOD AND APPARATUS FOR DECODING MANCHESTER ENCODED DATA

FIELD OF THE INVENTION

This invention relates to a method and apparatus for decoding Manchester (also known as split phase) encoded data.

BACKGROUND OF THE INVENTION

It is well known to use Manchester encoding of binary data for example for transmission of the data. In Manchester encoding, a data '1' is represented by the two-bit word 10, and a data '0' is represented by the opposite two-bit word 01. The transmitted bit rate is thus twice the data rate. Advantages of Manchester encoding include a high signal transition density (changes between '0' and '1' bits) which facilitates clock recovery, a null d.c. component in the transmitted signal spectrum, and the ability to detect data errors as sequence violations (e.g. the two-bit words 00 and 11 represent errors rather than valid data).

In decoding Manchester encoded data, it is necessary for the decoder to be synchronized to the two-bit word boundaries. For example, a series of data '1's is encoded as a bit sequence ... 10101010. ..; if the decoder is out of phase with the word boundaries, this will be incorrectly interpreted as a series of data 'O's, i.e. the bit sequence ... 0101010... In the event that the decoder is in phase with the word boundaries, transmission errors may occur in the Manchester encoded bit sequence, such errors appearing to the decoder as sequence violations which can cause an erroneous phase slip. In this event the decoder operates out of phase with the word boundaries until further sequence violations produce a subsequent phase slip.

Such erroneous phase slips can lead to significant problems, especially in continuous (as distinct from packetized) digital transmission systems in which they may cause loss of frame synchronization.

SUMMARY OF THE INVENTION

Accordingly, an object of this invention is to provide an improved method and apparatus for decoding Manchester encoded data, in which erroneous phase slips due to bit errors are reduced or substantially avoided.

According to one aspect this invention provides, a method of decoding data represented by a bit stream in which two bit sequences, 10 and 01 bit sequences represent respective data bits, comprising the steps of: producing a clock signal with a period corresponding to the duration of each data bit; producing decoded data from the bit stream in dependence upon the clock signal; detecting in the bit stream consecutive bits having the same binary value; in response to such detection, advancing a state machine towards a first state or towards a second state, the first and second states representing respectively synchronized and out-of-synchronism phases of the clock signal, with respect to the data bit sequences, in dependence upon the phase of the clock signal, the state machine having at least one intermediate state between the first and second states for reducing erroneous phase slips due to bit errors; and in response to the state machine having the second state, effecting a phase slip of the clock signal and advancing the state machine towards the first state.

In general, the state machine has m+1 states, where m is an integer equal to 2 or more. In response to each pair of consecutive bits in the bit sequence having the same binary value, which bits in the absence of errors occur on opposite sides of a word (data bit) boundary (i.e. they are the second bit representing a data bit of a first value and the first bit representing a following data bit of the opposite value), the state machine is advanced towards the first state if the clock signal phase is such that these consecutive bits cross a word boundary (a phase assertion as described below), and is advanced towards the second state if the clock signal phase is such that these consecutive bits are part of a single word (a phase error as described below).

Preferably the state machine comprises a counter and the step of advancing the state machine towards the first and second states comprises increasing and decreasing a count of the counter. Conveniently the step of advancing the state machine towards the first state in response to the state machine reaching the second state comprises the state machine to the first state after changing effecting a phase slip of the clock signal.

According to another aspect this invention provides a decoder for decoding data represented by a bit stream in which 10 and 01 bit sequences represent respective data bits, comprising: first means for producing a clock signal with a period corresponding to the duration of each data bit; second means for producing decoded data from the bit stream in dependence upon the clock signal; a state machine having a first state representing a synchronized phase of the clock signal, a second state representing an out-of-synchronism phase of the clock signal, each, with respect to the data bit sequences, and at least one intermediate state between the first and second states for reducing erroneous phase slips due to bit errors; third means responsive to the occurrence in the bit stream of two consecutive bits having the same binary value for changing the state of the state machine in a direction towards or away from the first state in dependence upon the phase of the clock signal; and means responsive to the state machine having the second state for effecting a phase slip of the clock signal and for changing the state of the state machine in a direction towards the first state.

Preferably the state machine comprises an up/down counter and the first, intermediate, and second states of the state machine comprise first, intermediate, and second counts respectively of the counter. Conveniently the means for changing the state of the state machine in response to the state machine having the second state comprises means for resetting the counter from the second count to the first count.

In an embodiment of the invention described in detail below, the first means comprises a flip-flop responsive to the state machine not having the second state for producing the clock signal with a frequency which is half the bit rate of the bit stream, the second means comprises a flip-flop responsive to the clock signal and the bit sequence for producing the decoded data by sampling of the bit sequence once for each period of the clock signal, and the third means comprises means for delaying the bit sequence by one bit duration and Exclusive-OR gating means responsive to the bit sequence and the delayed bit sequence for enabling a change in the state of the state machine.

BRIEF DESCRIPTION OF THE DRAWINGS

The invention will be further understood from the following description with reference to the accompanying drawings, in which.

DETAILED DESCRIPTION

Figure 1:
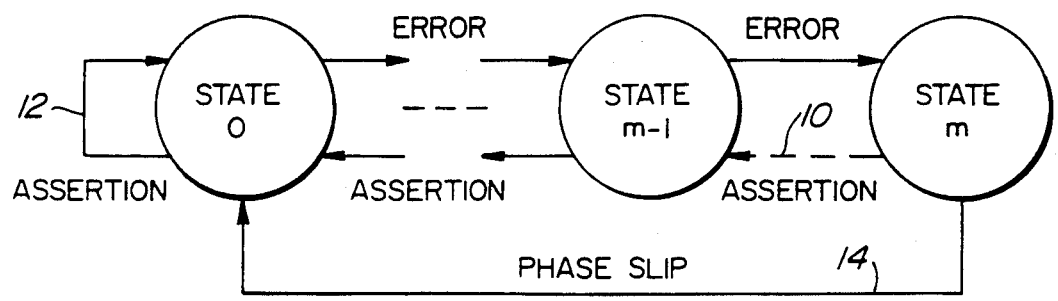
FIG. 1 is a generalized state diagram representing the operation of a decoder in accordance with an embodiment of this invention.

Referring to FIG. 1, a Manchester encoded data decoder in accordance with an embodiment of this invention can have any one of $m+1$ states, three of which are represented by circles labelled STATE 0, STATE $m-1$, and STATE m, m being an integer equal to 2 or more. Thus in its simplest form the decoder can have three states 0, 1, and 2, and more generally the decoder can have any desired number states 0, 1, 2, ... $m-1$, m, wherein STATE 0 represents the first state, STATE m represents the second state, and STATES 1 through $m-1$ represent intermediate states. The $m-1$ intermediate states between the first and second states, effectively absorb bit errors and decrease the number of invalid transistions to the second state, which would result in erroneous phase slips.

Transitions between states of the decoder occur in response to phase errors and phase assertions, as discussed further below. More particularly, in any of the states 0 to $m-1$ the occurrence of a phase error produces a transition to the next higher state 1 to m respectively. In any of the states 1 to $m-1$ (and optionally also m, as shown by a broken line 10 in FIG. 1 from STATE m to STATE $m-1$) the occurrence of a phase assertion produces a transition to the next lower state 0 to $m-2$ (and optionally $m-1$) respectively. In the state 0, the occurrence of a phase assertion maintains the decoder in this state, as shown by a line 12. From STATE m (in the optional case in the absence of a phase assertion) the decoder automatically effects a phase slip, shifting by one bit its recognition of the two-bit word boundaries in the encoded data, and reverts to a lower state as shown by a line 14 in FIG. 1. In FIG. 1 and in the embodiment of the decoder described below this lower state is STATE 0, but it could instead be an intermediate one of the states 1 to $m-1$ (desirably in the lower part of this range).

In a Manchester encoded bit stream, in the absence of bit and phase errors two consecutive occurrences of the same bit (1 or 0) only occur across a two-bit word boundary. In decoders in accordance with embodiments of this invention, a phase error, causing a transition to the next higher state as discussed above, is deemed to occur if both bits of a two-bit word have the same binary value. A phase assertion as discussed above occurs if there is a two-bit word boundary between two consecutive occurrences of the same bit value in the encoded data. This will become more clear from the description below with reference to FIGS. 2 and 3 of the drawings.

Figure 2:
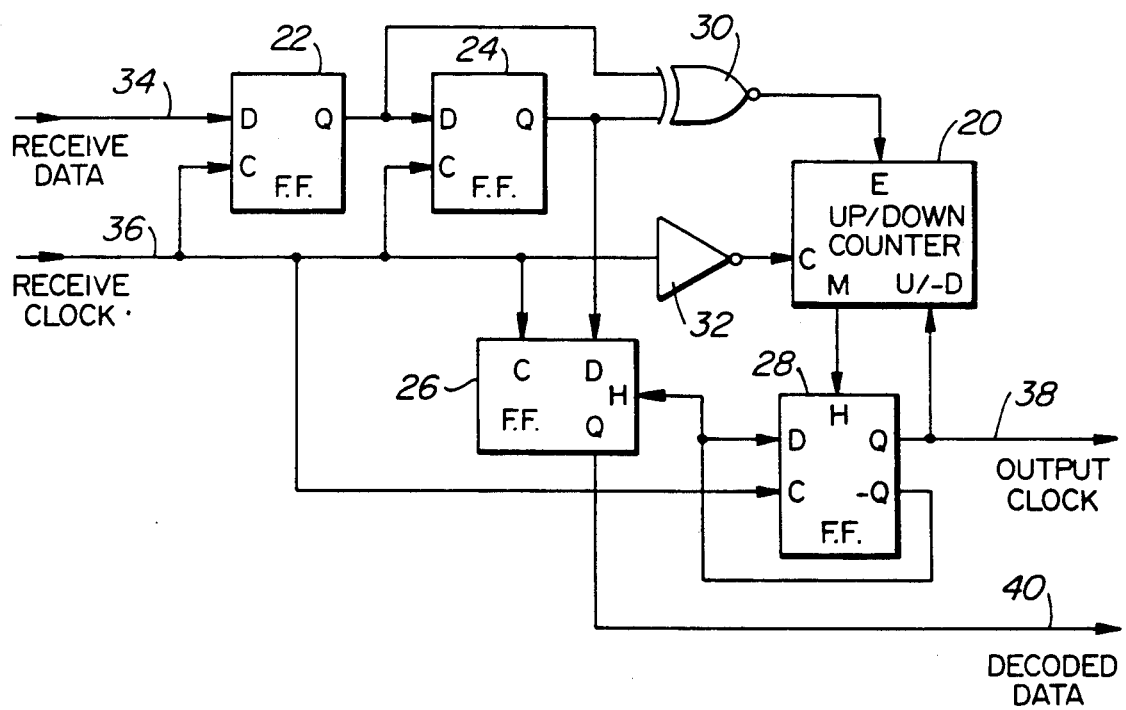
FIG. 2 schematically illustrates a circuit diagram of such a decoder.

In the Manchester encoded data decoder of FIG. 2, an up/down counter 20, which can have a count of 0, 1, 2 ... $m-1$, m, constitutes a state machine with states corresponding to those of FIG. 1 as described above. From STATE m there is no return to STATE $m-1$, i.e. there is no line 10 as in FIG. 1, but there is only a phase slip (line 14) with a return to STATE 0. It should be appreciated that the counter operation may be readily modified to modify these parameters as desired. In addition, in this decoder the counter 20 counts up or down by one in response to a phase error or assertion respectively, consistent with the state diagram of FIG. 1, but it should be appreciated that this also may be modified as desired. For example, the counter 20 could be modified to increase its count by 2 or more in response to each phase error, and to decrease its count by one in response to each phase assertion. The manner in which such modifications may be implemented is well within the knowledge of those of ordinary skill in the art, given the description herein.

In addition to the up/down counter 20, the decoder of FIG. 2 comprises four D-type flip-flops 22, 24, 26, and 28, a gate 30, and an inverter 32. Each of the flip-flops has a data input D, a clock input C, and a non-inverting output Q; the flip-flop 28 also has an inverting output $-Q$. In addition, each of the flip-flops 26 and 28 has a hold input H; a logic 1 at the input H maintains the flip-flop in its current state, regardless of the signals at its inputs C and D. Each of these flip-flops can, for example, comprise a conventional D-type flip-flop with a two-input data selector, controlled by the input H, for selecting as a data input either the data input as shown in FIG. 2 (H=0) or the Q output of the flip-flop (H=1).

The gate 30 is a two-input Exclusive-OR gate with an inverting output, connected to a count enable input E of the counter 20 to enable the counter to count up or down when both inputs of the gate 30 have the same binary value. The counter 20 also has a clock input C, an up/down control input $U/-D$ which controls the count direction (up with a logic 1, down with a logic 0, at this input), and an output M at which the counter produces a logic 1 when it has its maximum count m, and otherwise produces a logic 0.

A Manchester encoded data stream is supplied via a receive data line 34 to the input D of the flip-flop 22, and a receive clock signal, recovered in known manner from the receive data, is supplied via a line 36 to the clock inputs C of all of the flip-flops 22, 24, 26, and 28, and via the inverter 32 to the clock input C of the counter 20. The output Q of the flip-flop 22 is connected to one input of the gate 30 and to the input D of the flip-flop 24, whose output Q is connected to the other input of the gate 30. Thus receive data bits on the line 34 are clocked successively through the flip-flops 22 and 24, and the gate 30 enables the counter 20 whenever two consecutive bits of the receive data have the same binary value, i.e. whenever there is a phase error or a phase assertion.

The flip-flop 28 has its input D connected to its output -Q, and its input H connected to the counter output M, so that unless the counter 20 has its maximum count m this flip-flop divides the frequency of the receive clock by two to produce at its output Q, and hence on a line 38 connected thereto, an output clock signal at the decoded data rate. This output Q of the flip-flop 28 is also connected to the input $U/-D$ of the counter 20, to control the count direction and distinguish between phase errors and phase assertions. When the counter 20 has its maximum count m, its output M is a logic 1 to inhibit toggling of the flip-flop 28 for one period of the receive clock on the line 36, thereby to effect a phase slip. From this maximum count m, the counter 20 is internally synchronously cleared, to a count of 0, by the next falling edge of the receive clock.

The flip-flop 26 has its input D connected to the output Q of the flip-flop 24, its input H connected to the output -Q of the flip-flop 28, and its output Q connected to an output line 40 at which it produces the decoded data.

Figure 3:
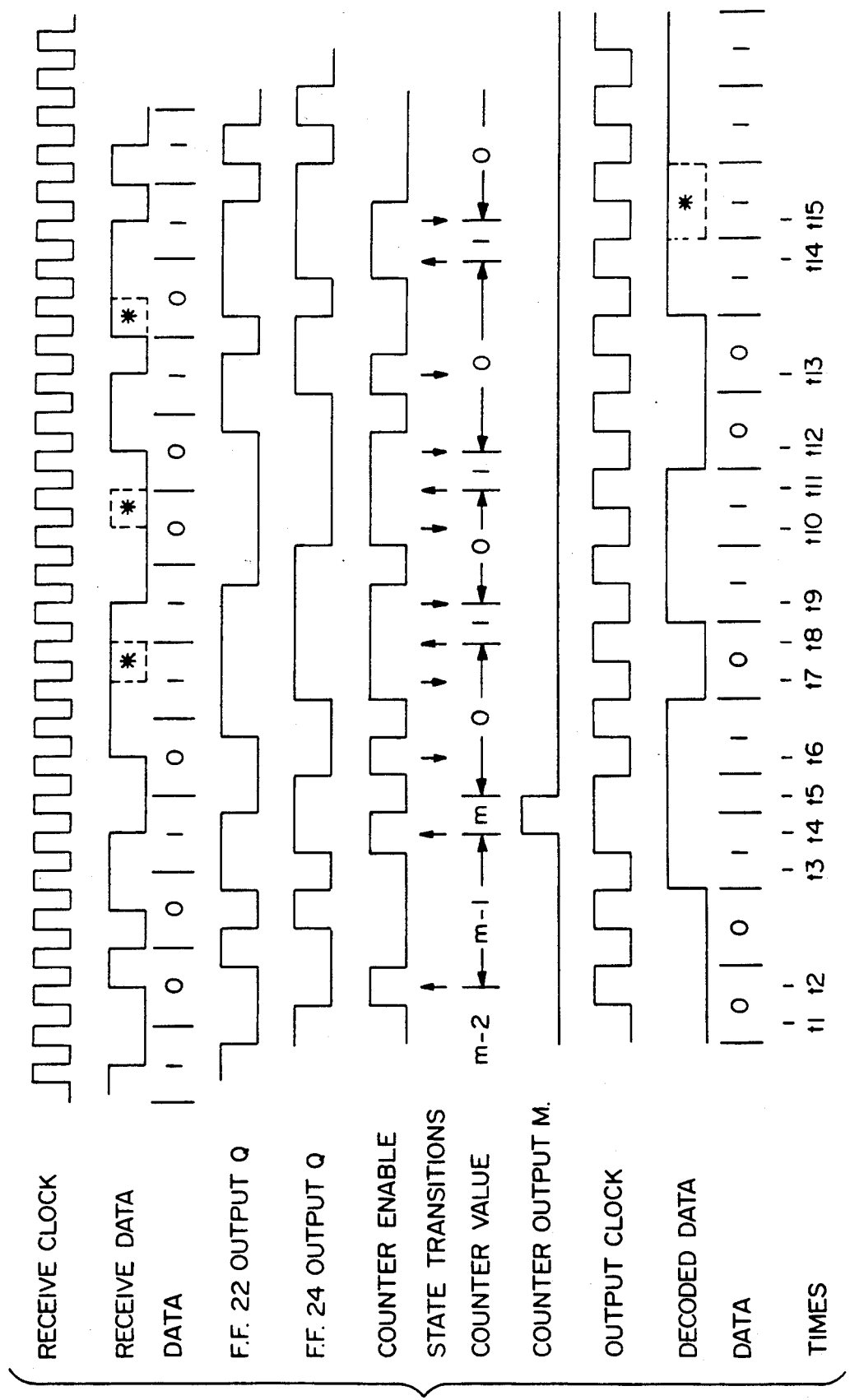
FIG. 3 is a timing diagram illustrating signals which can occur in operation of the decoder of FIG. 2.

The operation of the decoder will be further understood from the timing diagram in FIG. 3 which illustrates, from top to bottom, the receive clock on the line 36, a Manchester encoded receive data stream on the line 34, the data represented thereby, the Q output signals of the flip-flops 22 and 24, the output of the gate 30 constituting the counter enable input signal, arrows representing the timing and direction of state transitions (arrows up indicating phase errors, arrows down indicating phase assertions), the count or value of the counter 20, the output M of the counter 20, the output clock on the line 38, the decoded data on the line 40, the data represented thereby, and times which are referred to below.

It is assumed in FIG. 3 that the decoder is initially out-of-synchronism with the word boundaries of the Manchester encoded receive data, and that the counter 20 has an initial value or count of m−2. It is further assumed that the receive data signal, shown as a solid line, contains errors in three bits marked by asterisks, where the receive data signal should properly follow the broken line indicated at these bit positions. The last of these bit errors, because it occurs in the first bit of a two-bit Manchester encoded word, produces a corresponding error in the decoded data, also shown by an asterisk.

As already indicated above, the counter is enabled in response to each pair of consecutive bits of the receive data which have the same value. Thus for example the receive data bits immediately before and after a time t1 are both 0, resulting half a receive clock period later in the counter enable signal becoming 1 for one receive clock period. In the middle of this clock period, at a time t2, with the falling edge of the receive clock the counter 20 is clocked to count in a direction determined by the state of the output clock at this time. At this time the output clock is 1, representing (erroneously because the detector is out of synchronism with the receive data word boundaries) a phase error, so that the counter 20 counts up, as indicated by the upwardly directed state transition arrow at the time t2, from the counter value m−2 to m−1.

Similarly, the receive data bits immediately before and after a time t3 are both 1, resulting one receive clock period later at a time t4, when the output clock is 1again representing a phase error, in the counter 20 being incremented to its maximum count m. Consequently, at the time t4 the counter output M becomes 1. One receive clock period later, at a time t5, with a falling edge of the receive clock the counter is synchronously cleared to a count of 0, and the counter output M again becomes 0. Between the times t4 and t5 the counter output M inhibits toggling of the flip-flop 28, so that the output clock phase is reversed, corresponding to a phase slip as represented by the line 14 in FIG. 1. As a result, the decoder is synchronized to the encoded data word boundaries, so that (except for bit errors) the data is subsequently correctly decoded.

At times t6, t7, t10, and t13, in response to correctly interpreted word boundaries on both sides of which the encoded data bits have the same binary value, the counter is enabled while the output clock is 0 representing a phase assertion. At these times the counter value is 0 so that it can not be further decremented and remains 0, corresponding to the path represented by the line 12 in FIG. 1.

At times t8, t11, and t14, in each case in consequence of a bit error in the receive data as discussed above and shown by an asterisk, the counter is enabled when the output clock is 1, representing an error, and the counter is therefore incremented to a count value of 1. In each case shortly afterwards, at times t9, t12, and t15 respectively, again in consequence of the bit error in the receive data the counter is again enabled when the output clock is 0, representing a phase assertion and returning the counter to the count value of 0. Thus single bit errors do not result in phase slips of the decoder, in contrast to the initial phase error and consequent phase slip at about the time t5.

In fact, an error density in the receive data stream of nearly one in four bits is necessary to produce an erroneous phase slip of the decoder, or to prevent the decoder from becoming synchronized to the Manchester encoded word boundaries.

As can be seen from FIG. 3, the decoded data is produced by the flip-flop 26 effectively sampling the delayed receive data bit sequence at the output Q of the flip-flop 24 once during each period or cycle of the output clock on the line 38, with the rising edge of the receive clock when the output clock is a logic 1. Because this sampling is effectively a sampling of the first bit in each two-bit data word, of the three bit errors shown by the asterisks in the receive data only the third bit error, occurring in a first bit position, produces a corresponding error in the decoded data. Apart from this error, the data is correctly decoded after the time t5 when phase synchronism is established. As will be appreciated by those of ordinary skill in the art, the counter value itself may be used to provide an indication of the reliability of the decoded data, and if desired of the bit error rate.

Although a particular embodiment of the invention has been described in detail, it should be appreciated that numerous modifications, variations, and adaptations may be made thereto within the scope of the invention as defined in the claims. In particular, in addition to the specific alternatives and options which have already been mentioned it should be appreciated that the state machine constituted by the up/down counter 20 could instead be constituted by a shift register, accumulator, or other integrating or summing means, with appropriate modification of the associated decoder circuitry.

What is claimed is:

1. A method of decoding data represented by a bit stream in which two bit, sequences, 10 and 01 represent respective data bits, comprising the steps of:
   producing a clock signal with a period corresponding to the duration of each data bit;
   producing decoded data from the bit stream in dependence upon the clock signal;
   detecting in the bit stream consecutive bits having the same binary value;
   in response to such detection, advancing a state machine towards a first state or towards a second state, the first and second states representing respectively synchronized and out-of-synchronism phases of the clock signal, with respect to the data bit sequences, in dependence upon the phase of the clock signal, the state machine having at least one intermediate state between the first and second states for reducing erroneous phase slips due to bit errors; and in response to the state machine having the second state, effecting a phase slip of the clock signal and advancing the state machine towards the first state.

2. A method as claimed in claim 1 wherein the state machine comprises a counter and the step of advancing the state machine towards the first and second states comprises increasing and decreasing a count of the counter.

3. A method as claimed in claim 1 wherein the step of advancing the state machine towards the first state in response to the state machine reaching the second state comprises changing the state machine to the first state after effecting a phase slip of the clock signal.

4. A decoder for decoding data represented by a bit stream in which 10 and 01 bit sequences represent respective data bits, comprising:

first means for producing a clock signal with a period corresponding to the duration of each data bit;

second means for producing decoded data from the bit stream in dependence upon the clock signal;

a state machine having a first state representing a synchronized phase of the clock signal, a second state representing an out-of-synchronism phase of the clock signal, each, with respect to the data bit sequences, and at least one intermediate state between the first and second states for reducing erroneous phase slips due to bit errors;

third means responsive to the occurrence in the bit stream of two consecutive bits having the same binary value for changing the state of the state machine in a direction towards or away from the first state in dependence upon the phase of the clock signal; and means responsive to the state machine having the second state for effecting a phase slip of the clock signal and for changing the state of the state machine in a direction towards the first state.

5. A decoder as claimed in claim 4 wherein the state machine comprises an up/down counter and the first, intermediate, and second states of the state machine comprise first, intermediate, and second counts respectively of the counter.

6. A decoder as claimed in claim 5 wherein the means for changing the state of the state machine in response to the state machine having the second state comprises means for resetting the counter from the second count to the first count.

7. A decoder as claimed in claim 4 wherein the first means comprises a flip-flop responsive to the state machine not having the second state for producing the clock signal with a frequency which is half the bit rate of the bit stream.

8. A decoder as claimed in claim 4 wherein the second means comprises a flip-flop responsive to the clock signal and the bit sequence for producing the decoded data by sampling of the bit sequence once for each period of the clock signal.

9. A decoder as claimed in claim 4 wherein the third means comprises means for delaying the bit sequence by one bit duration and Exclusive-OR gating means responsive to the bit sequence and the delayed bit sequence for enabling a change in the state of the state machine.

* * * * *